United States Patent
Greenfield et al.

(10) Patent No.: US 11,113,120 B1
(45) Date of Patent: Sep. 7, 2021

(54) INTENT-BASED AUTO SCALING OF VIRTUAL COMPUTING RESOURCES

(71) Applicant: Amazon Technologies, Inc., Seattle, WA (US)

(72) Inventors: James Greenfield, Cape Town (ZA); Willem Visser, Cape Town (ZA); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 16/406,290

(22) Filed: May 8, 2019

(51) Int. Cl.
*G06F 9/50* (2006.01)

(52) U.S. Cl.
CPC .... *G06F 9/5077* (2013.01); *G06F 2209/5021* (2013.01)

(58) Field of Classification Search
None
See application file for complete search history.

(56) References Cited

U.S. PATENT DOCUMENTS

| | | | | |
|---|---|---|---|---|
| 8,966,085 | B2* | 2/2015 | Abuelsaad | G06Q 10/06315 709/226 |
| 9,448,824 | B1* | 9/2016 | Fitzgerald | G06F 9/45533 |
| 9,712,503 | B1* | 7/2017 | Ahmed | G06F 21/606 |
| 9,804,890 | B1* | 10/2017 | Pai | G06F 9/50 |
| 9,848,041 | B2* | 12/2017 | Einkauf | G06F 9/5083 |
| 9,971,621 | B1* | 5/2018 | Berg | G06F 9/45558 |
| 9,998,331 | B2* | 6/2018 | Jones | H04L 67/1031 |
| 10,069,869 | B2* | 9/2018 | Lewis | H04Q 9/02 |
| 10,409,642 | B1* | 9/2019 | Tang | G06F 9/5061 |
| 10,754,691 | B2* | 8/2020 | Geiger | H04L 63/10 |
| 2011/0264805 | A1* | 10/2011 | Breitgand | G06F 9/45558 709/226 |
| 2013/0054776 | A1* | 2/2013 | Kunze | G06F 9/5061 709/224 |

(Continued)

OTHER PUBLICATIONS

Hasan et al.; "Integrated and Autonomic Cloud Resource Scaling"; IEEE 2012, (Hasan_2012.pdf; pp. 1-8) (Year: 2012).*

(Continued)

*Primary Examiner* — Hiren P Patel
(74) *Attorney, Agent, or Firm* — Nicholson De Vos Webster & Elliott LLP

(57) ABSTRACT

Techniques are described for enabling users to configure the auto scaling of virtual computing resources using various intent-based auto scaling configurations. Intent-based configurations generally provide various indications of how a user intends to use a scalable group of virtual computing resources and what expectations a user might have about how those resources are scaled in response to changes in demand. A service provider network receives first input to create a scalable group of virtualized computing resources, the first input indicating at least one primary scaling configuration used by the hardware virtualization service to scale the scalable group of compute instances over time, and further receives second input indicating at least one secondary, intent-based scaling configuration used to scale the virtualized computing resources, for example, when the service is unable to scale the group of virtualized computing resources according to the at least one primary scaling condition.

20 Claims, 8 Drawing Sheets

(56) References Cited

U.S. PATENT DOCUMENTS

| | | | |
|---|---|---|---|
| 2015/0281113 A1* | 10/2015 | Siciliano | H04L 43/0817 |
| | | | 709/226 |
| 2015/0378765 A1* | 12/2015 | Singh | G06F 9/50 |
| | | | 718/1 |
| 2016/0204923 A1* | 7/2016 | Ashok | H04L 67/10 |
| | | | 709/226 |
| 2016/0323377 A1* | 11/2016 | Einkauf | H04L 67/1076 |
| 2017/0046204 A1* | 2/2017 | Li | G06F 9/5061 |
| 2018/0039516 A1* | 2/2018 | Biran | G06F 9/5061 |

OTHER PUBLICATIONS

Kang et al.; "A SLA driven VM Auto-Scaling Method in Hybrid Cloud Environment"; IEICE 2013, (Kang_2013.pdf; pp. 1-6) (Year: 2013).*

* cited by examiner

INTENT-BASED AUTO SCALING OF VIRTUAL COMPUTING RESOURCES

BACKGROUND

Service provider networks have enabled businesses and other organizations to more easily develop, deploy, and scale virtually any type of computing workload using various types of virtual computing resources. The services provided by these service provider networks generally enable users to use, for example, compute resources (for example, by hosting virtual machine (VM) instances or containers, executing batch jobs, executing code without provisioning servers, and so forth), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), and the like.

Many service provider networks further enable users to automate capacity management of various virtual computing resources to some degree, including the management of compute instance capacity and the capacity associated with other "elastic" virtual computing resources. In the context of compute instances, for example, an auto scaling service can help users generate configurations used to automatically provision and de-provision compute instances as the load associated with the user's applications that use the compute instances varies over time. To manage this type of capacity scaling, some service provider networks enable users can create scalable collections of compute instances, sometimes referred to as "auto scaling groups." Users can specify scaling policies associated with an auto scaling group, for example, such that the service provider network automatically launches and terminates compute instances as demand for a user's application increases and decreases over time.

BRIEF DESCRIPTION OF DRAWINGS

Various embodiments in accordance with the present disclosure will be described with reference to the drawings, in which.

DETAILED DESCRIPTION

Figure 1:
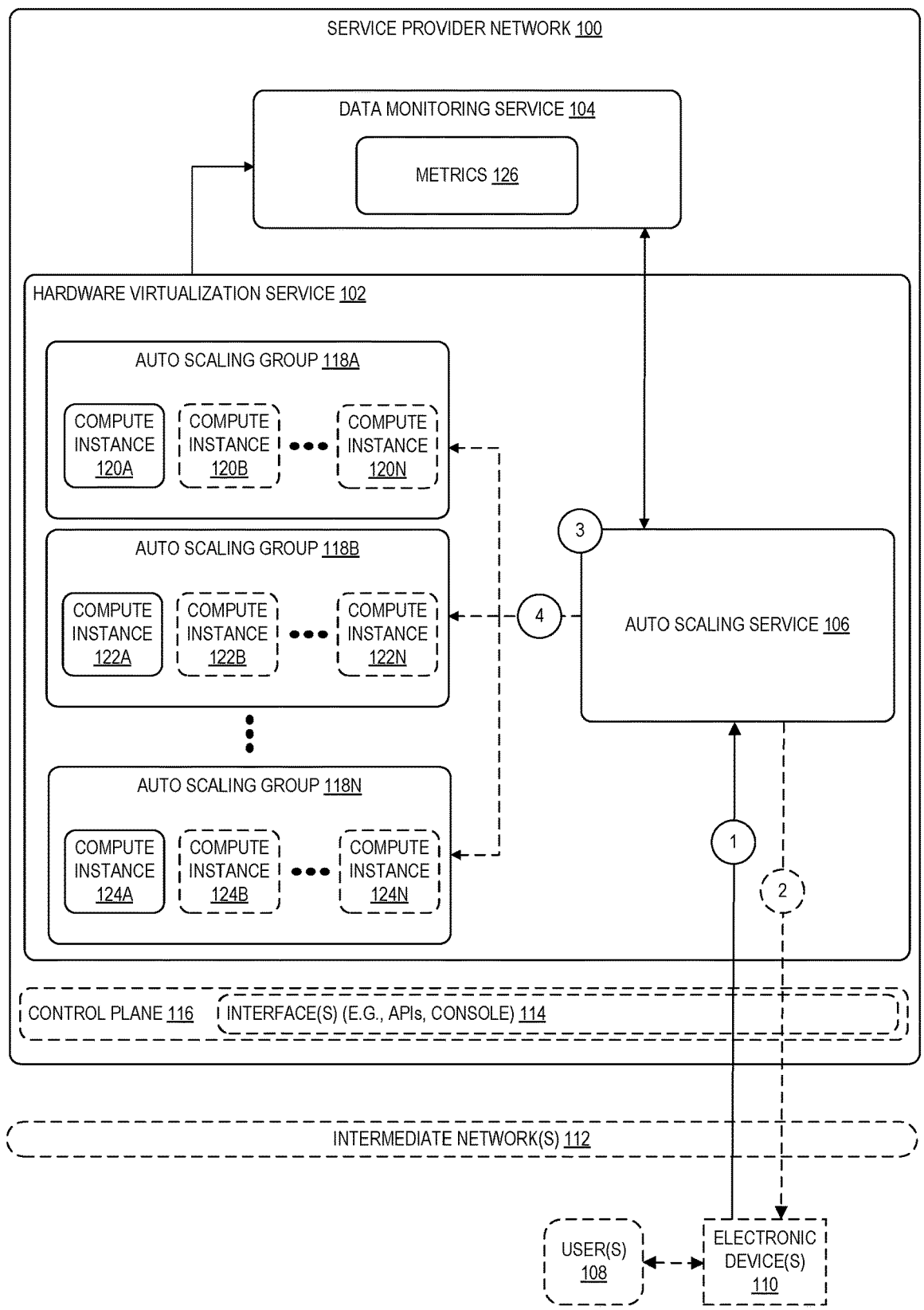
FIG. 1 is a diagram illustrating an example environment including an auto scaling service that scales virtual computing resources based at least in part on intent-based auto scaling configurations provided by users according to some embodiments.

Various embodiments of methods, apparatus, systems, and non-transitory computer-readable storage media are described for enabling users to configure the auto scaling of virtual computing resources provided by a service provider network using various intent-based auto scaling configurations. According to some embodiments, intent-based configurations generally provide various indications of how a user intends to use a scalable group of virtual computing resources and what expectations a user might have about how those virtual computing resources scale in response to changes in demand for the computing resources. In some embodiments, a service provider network receives first input to create a scalable group of virtualized computing resources, the first input indicating at least one primary scaling configuration used by the hardware virtualization service to scale the scalable group of compute instances over time (for example, including a type and configuration of virtual computing resource to scale, a maximum quantity of computing resources in the group, and so forth).

In some embodiments, a service provider network further receives second input indicating at least one secondary, intent-based scaling configuration used to scale the scalable group of virtualized computing resources when the hardware virtualization service is unable to scale the group of virtualized computing resources according to the at least one primary scaling condition. Based on the at least one primary scaling condition and the at least one secondary scaling configuration, a fulfillment plan used to scale the group of virtualized computing resources over time is generated, and the resources are then scaled according to the generated fulfillment plan. Among other benefits, the ability to generate and execute a fulfillment plan that takes into account various intent-based configurations provided by a user can enable an auto scaling service to more efficiently manage capacity in scenarios where the service is unable to fully satisfy scaling requests due to capacity limitations or other conditions.

Auto scaling services provided by a service provider network generally enable users to automatically scale various types of virtual computing resources offered by a service provider network including, for example, compute instances, containers, storage resources, database tables and indexes, and the like. In the context of scaling compute instances, for example, scaling is typically initiated by an event, or scaling action, which causes an auto scaling service to either launch or terminate a number of compute instances included in a relevant auto scaling group. A scaling service usually provides several ways for users to scale their virtual computing resources including, for example, manual scaling which enables users to explicitly specify changes to the desired capacity of an auto scaling group, scheduled scaling which enables scaling actions to be performed automatically as a function of time and date, and demand-based scaling where scaling policies are used to control the scaling process based on one or more monitored metrics associated with an auto scaling group (for example, based on monitoring an average CPU utilization, incoming request count, or any other metrics or combinations thereof).

While the use of auto scaling services can help users scale their virtual computing resources at a service provider network, there is often a significant amount of variability in terms of how and when additional resources can be provided to users' auto scaling groups when it comes time to scale the resources. For example, auto scaling features generally are provided in a "best-effort" manner that can be constrained at times by a total amount of capacity and headroom available to an auto scaling service for use. If a user creates an auto scaling group of compute instances and configures the auto scaling group to scale up to a maximum of 100 compute instances, for example, there generally is no guarantee that an auto scaling service will be able to provide all 100 compute instances to the user's auto scaling group at any given time due to possible capacity limitations or other system conditions. However, if such users were able to provide additional information to the auto scaling service indicating how to prioritize various aspects of scaling the user's resources, the auto scaling service can perform the scaling in a way that possibly satisfies at least more basic requirements desired by the user.

According to embodiments described herein, to enable more flexible auto scaling, an auto scaling service of a service provider network further enables users to configure various "intent-based" auto scaling configurations in addition to the standard auto scaling configurations described above. In some embodiments, an auto scaling service includes an application program interface (API), web-based console, and/or other interfaces that enable users to provide such input. As described in more detail herein, the types of intent can include, for example, indications of whether the user is flexible in terms of the types of computing resources used to satisfy an auto scaling group's demand needs, whether the user is flexible in terms of when and how quickly such resources are provided to the user, information about the relative priority of various auto scaling groups to a user, among other options. In some embodiments, the auto scaling service further enables input to be provided instructing the auto scaling service to throttle scaling activities at times, if desired.

Among other benefits, the intent-based auto scaling features described herein provides users with more control over how to manage the scaling of their computing resources, if such control is desired, and thereby enables an auto scaling service to better satisfy scaling demands. The ability for users to specify more about their intent with respect to how their resources are used and scaled, and for a service provider to better match available capacity and headroom to users' indicated intent, enables the service provider to scale resources across many different users in a manner that better matches overall capacity constraints with incoming demand.

FIG. 1 is a diagram illustrating an example environment including an auto scaling service that scales virtual computing resources based at least in part on intent-based auto scaling configurations according to some embodiments. In some embodiments, a hardware virtualization service 102, a data monitoring service 104, and an auto scaling service 106, among any number of other possible services, operate as part of a service provider network 100. Each service comprises one or more software modules executed by one or more electronic devices at one or more data centers and geographic locations. User(s) 108 using one or more electronic device(s) 110 (which may be part of or separate from the service provider network 100) can interact with the various services of the service provider network 100 via one or more networks, such as the internet. Although the example shown in FIG. 1 describes the scaling of virtual computing resources provided by a hardware virtualization service (for example, VM instances or containers), the processes described herein can be used to improve auto scaling processes related to virtually any type of virtual computing resource including, but not limited to, VM instances, containers, database tables or indexes, storage resources, and so forth.

A service provider network 100 provides users with the ability to utilize one or more of a variety of types of computing-related resources such as compute resources (for example, executing VM instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service 102 that can execute compute instances, a storage service that can store data objects, and so forth. The users (or "customers") of service provider networks 100 may utilize one or more user accounts that are associated with a customer account, though these terms may be used somewhat interchangeably depending upon the context of use. Users may interact with a service provider network 100 across one or more intermediate networks 112 (for example, the internet) via one or more interface(s) 114, such as through use of application programming interface (API) calls, via a console implemented as a website or application, etc. The interface(s) 114 may be part of, or serve as a front-end to, a control plane 116 of the service provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting a computing job or code to be executed by the provider network, which in turn utilizes one or more compute instances to execute the job or code, typically without the user having any control of or knowledge of the underlying compute instance(s) involved.

As indicated above, users often desire the ability to scale the capacity of their virtual computing resources to maintain steady and predictable performance of their applications. For example, consider a user that desires to provision some number of compute instances to support a web-based application for which the user is responsible, and further desires for the number of compute instances to increase and decrease as demand for the user's application changes over time. The user's application, for example, may generally experience heavy load during the day compared to nights and on weekdays compared to weekends, and the overall use of the application may increase over periods of months as it grows in popularity. For this purpose, the user uses the auto scaling service 106 to create an auto scaling group 118A associated with a scalable collection of compute instances 120A-120N. The same user, as well as any number of other users of the service provider network 100, have similarly created other auto scaling groups 118B-118N for other purposes (where an auto scaling group 118B including compute instances 122A-122N, for example, might be used to support one or more other types of applications for which the user is responsible, auto scaling group 118N including compute instances 124A-124N might be used as a testing pool of instances for the production web-application, and so forth). Although only a limited number of auto scaling groups 118A-118N are shown in FIG. 1, in general, an individual user can be associated with any number of separate auto scaling groups and there may be a large number of auto scaling groups of varying sizes across all users of the service provider network 100, where the auto scaling groups may further include different compute instance types and be used to support any number of different types of workloads.

In some embodiments, an auto scaling service 106 helps users automate capacity management for any of various services of a service provider network, including a hardware virtualization service 102, in part by tracking capacity utilization of auto scaling groups over time. In the context of scaling compute instances provided by a hardware virtualization service 102, as in FIG. 1 for example, scaling is typically initiated by an event, or scaling action, which instructs an auto scaling service 106 to either launch or terminate a quantity of compute instances included in one or more auto scaling groups. As an example, a user can configure an auto scaling group 118A to increase or decrease a quantity of associated compute instances based on a monitored average CPU utilization of the instances, a quantity of incoming requests, or based on any other metric associated with the compute instances which may reflect a load on the instances over time.

In some embodiments, to enable an auto scaling service to monitor the load associated with auto scaling groups, some of all the compute instances of the auto scaling groups 118A-118N are configured to periodically emit or otherwise send various performance metrics to a data monitoring service 104 or other component of the service provider network 100. A data monitoring service 104 collects monitoring and operational data in the form of logs, metrics, and events, related to virtually any type of computing resource of a service provider network 100 including compute instances managed by a hardware virtualization service 102. An auto scaling service 106 can obtain these metrics from the data monitoring service 104 or, in other examples, directly from one or more auto scaling groups 118A-118N.

Although the data monitoring service 104 is shown as a separate standalone service of the service provider network 100 in FIG. 1, in other examples, the data monitoring service 104 may be a component of the hardware virtualization service 102, auto scaling service 106, or a component of another service of the service provider network 100. In some embodiments, metrics may be collected and stored separately for each auto scaling group (for example, stored as time series data corresponding to auto scaling group 118A, separate time series data corresponding to auto scaling group 118B, time series data corresponding to auto scaling group 118N, and so forth), or separately for different users of the service provider network 100 or other logical groupings, for example, by using distinct "namespaces" to identify the respective metrics at the data monitoring service 104.

As indicated above, in some embodiments, an auto scaling service 106 further enables users to specify various intent-based auto scaling configurations to better enable an auto scaling service 106 to scale the user's resources in cases where, for example, the service is unable to fully satisfy one or more primary scaling configurations because of capacity limitations or other conditions. At a high level, intent-based auto scaling features enable users to specify aspects of the user's intent with respect to an auto scaling group such as, for example, indications of how a user intends to use one or more auto scaling groups and how the user expects the associated resources to be able to scale in the future. As described below, the auto scaling service 106 can then generate a fulfillment plan based on the user input, information about available capacity as a whole and a rate at which the service can process new scaling requests, and use the fulfillment plan to scale the resources accordingly.

In some embodiments, at circle "1" in FIG. 1, a user sends one or more requests to an auto scaling service to create and configure and auto scaling group, including input indicating at least one primary scaling configuration and at least one secondary, intent-based scaling configuration. In some embodiments, a user uses one or more electronic device(s) 110 to generate such requests. For example, a user 108 may interact with an auto scaling service 106 of a hardware virtualization service 102 via a web-based console, command-line interface, or any other available interface. In other examples, a user 108 can configure auto scaling of one or more auto scaling groups via a separate service of the service provider network 100 and that may be integrated with the auto scaling service 106. In some embodiments, an auto scaling service 106 is a separate, standalone service of a service provider network 100, while in other embodiments the auto scaling service 106 is a component of a hardware virtualization service 102 or any other service of the service provider network 100.

As an example, consider a user that provides input used to create an auto scaling group and configures one or more primary scaling configurations indicating that the auto scaling group to be able to scale up to a maximum of 1,000 compute instances of a particular compute instance type (that is, a compute instance type associated with a particular configuration of available CPU, memory, and possibly other hardware resources). If a user application running on compute instances of the auto scaling group suddenly experiences a spike in traffic, the associated auto scaling group may request a large number of additional compute instances to handle the traffic up to the specified maximum number of instances. An auto scaling service 106 can attempt to satisfy the auto scaling request as specified by the user in the primary scaling configurations; however, the auto scaling service 106 cannot guarantee that the request can be fully satisfied depending on an amount of capacity available when the request happens to come in from the user (for example, based on a total amount of available capacity at the hardware virtualization service in the relevant geographic region(s) and a number of requests being received for a same compute instance type from other sources around the same point in time).

As indicated above, however, users can further provide input indicating one or more secondary scaling configurations used to scale the user's resources when, for example, the service is unable to scale the user's resources according to the user's primary scaling configurations. In the scenario above, for example, a user might provide an advance indication that the user expects to use a large number of additional compute instances during a defined period of time (for example, during a sale that the user's business conducts on a yearly basis and that is associated with high traffic volume), or that the user expects to be able to scale to some number of compute instances periodically but is flexible about when those compute instances are actually provided to the associated auto scaling group. As another example, the user might indicate an expected total amount of computing resources needed at points in the future (for example, in terms of total CPU resources, graphics processing unit (GPU) resources, memory, and so forth) and indicate that the hardware virtualization service can fulfill that demand using a non-homogeneous combination of compute instance types that might be available to satisfy the total resource needs. As yet another example, the user can specify information indicating a priority of various auto scaling groups relative to one another such that, if there are conflicting requests among multiple different auto scaling groups associated with the user, the hardware virtualization service can prioritize fulfilling the requested capacity for one auto scaling group before one or more other auto scaling groups that may be of lesser importance to the user.

In some embodiments, one type of secondary, intent-based scaling configuration that can be specified is an indication that it is satisfactory to the user if demand associated with a user's auto scaling group is satisfied using a non-homogeneous set of compute instances. For example, auto scaling groups typically are associated with a specified type of compute instance associated with a particular resource configuration, and an auto scaling service scales such auto scaling groups by obtaining additional compute instances of the same instance type having the same resource configuration. However, in some instances, a user may be satisfied if demand associated with an auto scaling group is fulfilled in whole or in part using two or more different types of compute instances associated with varying resource configurations.

For example, a user of the hardware virtualization service 102 might anticipate that their application will experience heavy load at one or more points of time in the future, and the user might prefer the ability to scale one or more auto scaling groups of compute instances using a same instance type and resource configuration to support the varying load. The ability to scale a same instance type and configuration, for example, might enable the user to more easily calculate how much traffic each machine can handle and to distribute traffic accordingly. However, the hardware virtualization service 102 may be unable to provide a quantity of a specific compute instance type requested by the auto scaling group at certain points in time due to conflicting requests from other sources for the same type of compute instance. Rather than simply denying the user the requested quantity of compute instances of the specified type, if the user provides input indicating that the user is willing to use other instance types if the entire demand cannot be satisfied using the specified instance type, the auto scaling service 106 can fulfill some or all of the remaining capacity request using other instance types having other resource configurations.

In some embodiments, additionally or alternatively to specifying flexibility in terms of compute instance types, a user can optionally provide input specifying that the user expects to use a total amount of capacity in an auto scaling group at various points in time. For example, a user may specify an anticipated need for some number of vCPUs, an aggregate amount memory, and/or any other resource parameters or combinations thereof. Similar to above, such input can further indicate that the auto scaling service 106 can satisfy the specified demand using any combination of available instance types or using any combination of a selected set of instance types. In these examples, some compute instances may thus handle more or less traffic than others, where this disparity in compute instances' ability to handle load can be managed by various load balancing elements that sit in front of the fleet of compute instances. In some embodiments, workloads that are placed on instances having varying resource capabilities can determine what type of instance they are running on, how much capacity is available to the workload, and scale its own operation based on the determined amount of available resources.

In some embodiments, another type of secondary, intent-based scaling configuration that a user can specify is a desired scaling velocity, or scaling timing, associated with an auto scaling group. For example, a user can specify an amount of resources that the user expects might be needed at some point in the future and can further indicate that the user is flexible in terms of when those additional resource are provided to the auto scaling group. For example, a user can provide input indicating that the user desires the ability to launch N compute instances of a particular type over the next three days but further specify that the requested ability is needed only over the next three days. This information can be used by the auto scaling service 106, for example, to optionally prioritize requests for the user during the specified timeframe relative to other requests it might receive from the same user or other users. In some embodiments, for auto scaling groups associated with jobs or workloads that a user has indicated are flexible in terms of timing, a user can further specify an estimated execution time for each job or workload (or such estimated execution times can be automatically determined) and a deadline for completion of each workload or the workloads collectively. In this manner, a user can indicate flexibility in terms of timing while ensuring that the workloads are nevertheless completed within a reasonable amount of time as determined by the user.

In some embodiments, another secondary scaling configuration that a user can specify is a request for a specified amount of capacity at one or more specified points of time in the future. For example, a user may provide input indicating a desire for an auto scaling group to scale to 1,000 compute instances at a specified point of time in the future (for example, at 10:00 AM two days from now). The auto scaling service 106, for example, can then balance the user's advance request against other requests from the same user, or requests from other users that may have more flexible requirements associated with their auto scaling groups, around the same period of time.

In an embodiment, another type of secondary scaling configuration that a user can specify is an indication of an importance or relative priority of an auto scaling group compared to other auto scaling groups associated with the same user. For example, a user might assign a higher priority to a first auto scaling group that is used to support execution of the user's production web-application in relation to one or more second auto scaling groups used to support operation of the user's back office metrics and that can be run more flexibly at times when there is sufficient capacity available (for example, every night when the user's primary auto scaling group is not in high demand). In this example, the user might also have one or more other auto scaling groups that are used only for testing purposes and that the user associates with an even lower priority relative to the user's other auto scaling groups. In some embodiments, input indicating a prioritization of auto scaling groups can further include an indication of proportional scaling requests for each auto scaling group. For example, a user can provide proportional prioritizations among workloads to specify that the user desires that at least 50% of the requested capacity for a first auto scaling group be satisfied before satisfying requests from any lesser priority auto scaling groups, and the like.

In an embodiment, an auto scaling service 106 can enable users to provide intent-based input indicating how the user prefers scaling operations to be performed during periods of low utilization. For example, a user may specify one or more workloads that the user desires to execute when the user's auto scaling groups generally are operating at relatively low utilization (for example, workloads corresponding to lower-priority, nightly jobs). In some embodiments, an auto scaling service 106 may similarly be able to incentivize users to run certain types of workloads during periods of time that are typically underutilized across a hardware virtualization service 102 or other virtual computing resource service. For example, capacity may typically be more abundant during certain holidays or during particular times of day and the auto scaling service 106 may incentive users to identify lower-priority workloads that it desires to run during these periods of expected low utilization with a lesser guarantee of capacity outside of these time windows.

In some embodiments, in connection with some or all of the intent-based configurations described herein, users can specify certain scaling limits. For example, a user can specify a limit for a particular auto scaling group, or for a group of auto scaling groups, indicating a maximum amount of scaling that the user desires to have occur. The limit, for example, can be expressed in terms of a maximum number of total compute instances at any given time, a maximum cost incurred by the user, a maximum number of computing hours, or using other similar thresholds. In an embodiment, the auto scaling service 106 can then ensure that execution of a fulfillment plan remains within the bounds of any user-specified thresholds.

In some embodiments, users can specify one or more auto scaling groups as being groups from which capacity can be borrowed by other auto scaling groups, if needed. For example, a user may provide input indicating that an auto scaling group created to host test workloads can forfeit its capacity to one or more higher priority auto scaling groups (for example, one or more auto scaling groups supporting production applications), if capacity cannot be obtained otherwise. In some embodiments, a user can specify a proportion of an auto scaling group that can be borrowed by other auto scaling groups (for example, up to 50% of an auto scaling groups total or current capacity).

In some embodiments, users can specify certain jobs or workloads that the user desires for the auto scaling service 106 to execute whenever the hardware virtualization service 100 as a whole has excess capacity (for example, during weekends, holidays, or other off-peak periods). In this example, the auto scaling service 106 may not provide any guarantees about when the specified jobs will be executed, where the user may be provided with a discount in exchange for the flexibility.

Figure 2:
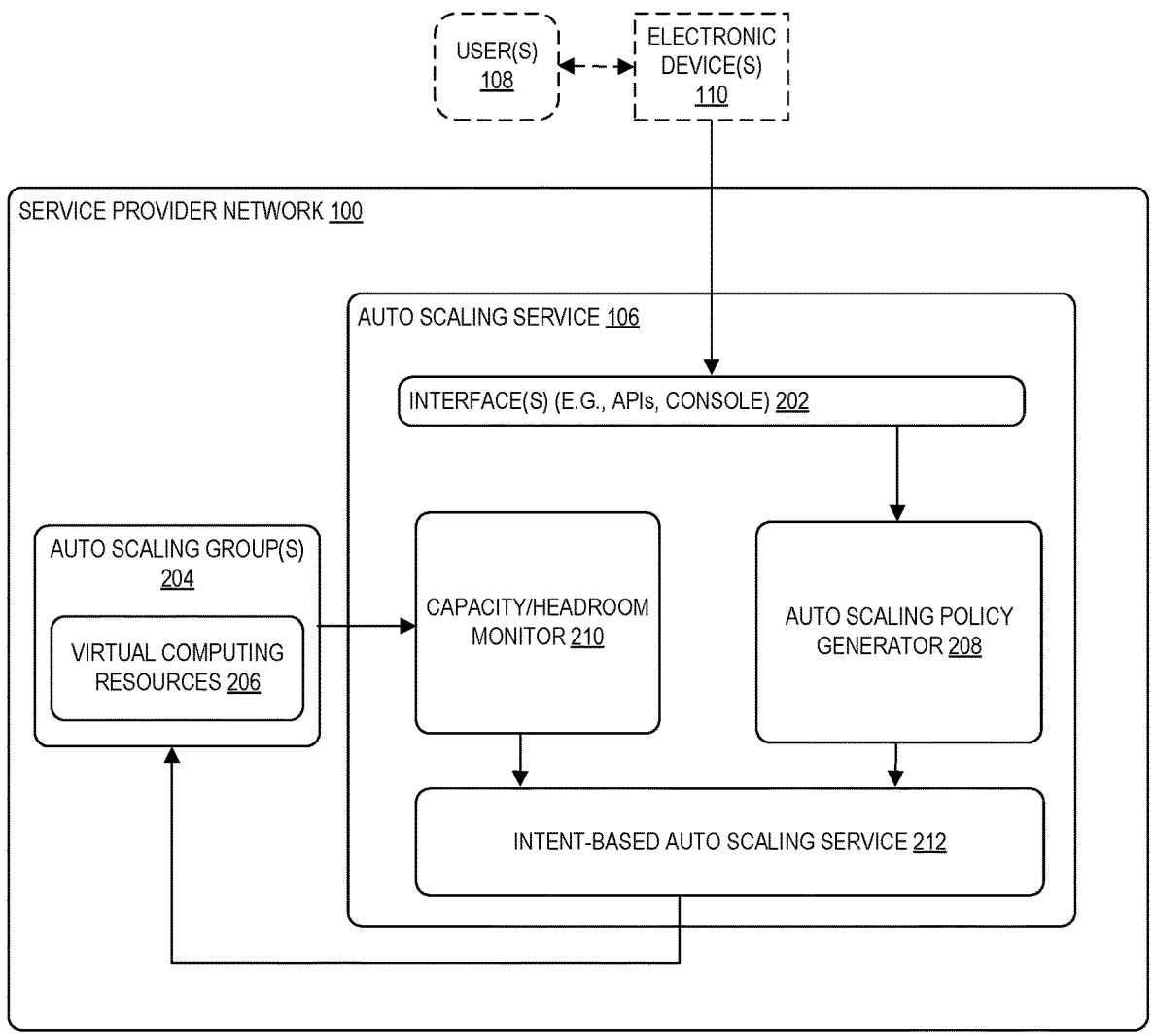
FIG. 2 is a diagram illustrating components of an auto scaling service that scales virtual computing resources based at least in part on intent-based auto scaling configurations provided by users according to some embodiments.

FIG. 2 illustrates components of an auto scaling service 106 enabling the intent-based auto scaling of virtual computing resources according to some embodiments. In some embodiments, an auto scaling service 106 includes several components including, for example, interfaces 202 enabling users to provide input used to create and configure auto scaling groups 204 of virtual computing resources 206, an auto scaling policy generator 208, a capacity/headroom monitor 210 that is able to obtain information about the current state of the capacity available to an auto scaling service 106, and an intent-based auto scaling service 212 that generates a fulfillment plan based on an auto scaling policy generated by the auto scaling policy generator 208 and system information obtained from the capacity/headroom monitor 210.

As indicated above, the interfaces 202 generally enable users to provide input specifying both (i) one or more primary auto scaling configurations, as well as (ii) one or more secondary, intent-based auto scaling configurations for an auto scaling group. The interfaces 202 can include, for example, an API, web-based console, command line interface (CLI), or any type of interface or combination thereof. In some embodiments, based on a combination of the primary and secondary auto scaling configurations, the auto scaling policy generator 208 can generate a policy for the user's auto scaling group, the policy generally defining how the user desires for one or more auto scaling groups to scale in response to load changes. An intent-based auto scaling service 212 can then use capacity/headroom information obtained from a capacity/headroom monitor 210 over time to generate a fulfillment plan that best satisfies the policy generated for an auto scaling group. For example, an intent-based auto scaling service 212 can use obtained capacity information to determine a current state of the system, to optionally predict an amount of capacity to be available at one or more points of time in the future, and to determine how to reserve and allocate capacity that best matches users' specified intent for their auto scaling group(s).

Figure 3:
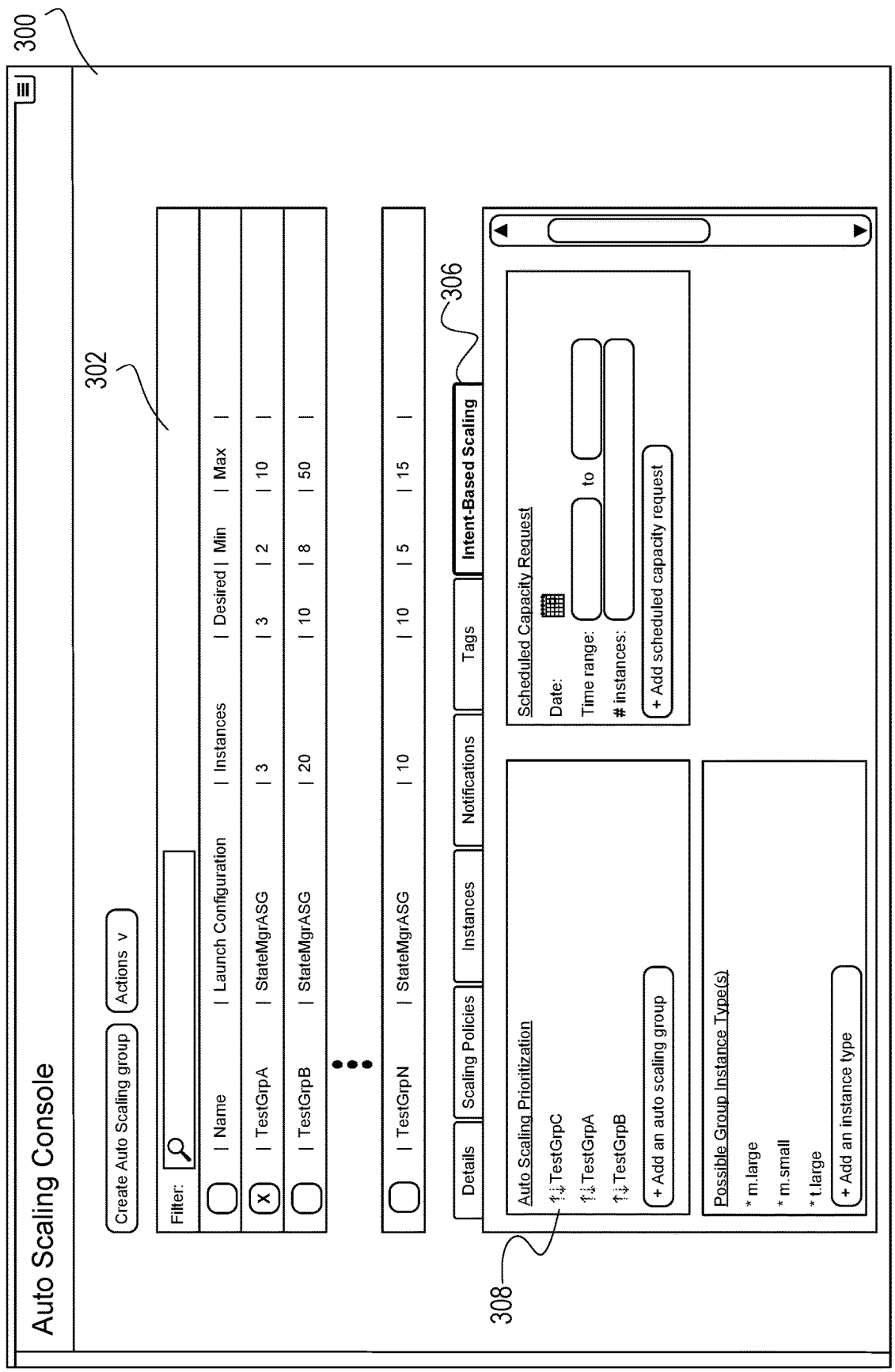
FIG. 3 illustrates an example graphical user interface (GUI) that can be used to configure various intent-based auto scaling configurations according to some embodiments.

FIG. 3 illustrates an example graphical user interface (GUI) that can be used to configure the intent-based auto scaling of virtual computing resources according to some embodiments. The interface 300 in FIG. 3, for example, includes an auto scaling group list 302, including various columns indicating information about each auto scaling group associated with a user account such as, for example, a name of the auto scaling group, launch configurations, a number of instances currently in the auto scaling group, a desired number of instances, a minimum and maximum number of instances, among other possible information.

The interface 300 of FIG. 3 further includes an intent-based scaling configuration panel 306 including interface elements that enable a user to specify various types of secondary scaling configurations related to a selected auto scaling group. For example, the panel 306 includes an auto scaling group prioritization component 308 that enables users to specify a prioritization for one or more of their auto scaling groups. The panel 306 may include other types of interface elements that enable users, for example, to specify types of compute instances that the user is willing to use for their auto scaling group, periods of time at which they desire to use specified number of instances, among any other types of intent-based configurations discussed herein.

Returning to FIG. 1, in some embodiments, at circle "2," the auto scaling service 106 optionally provides information to a user about their auto scaling configuration, possibly including one or more suggested scaling configurations. The auto scaling service 106, for example, may identify one or more auto scaling configurations that, if applied by the user to one or more of their auto scaling groups, are likely to provide a better experience for the user in terms of performance, cost, likelihood of a scaling request being entirely satisfied, or based on any other dimensions or combinations thereof.

In some embodiments, the auto scaling service 106 can present information about an expected level of service for one or more of the user's auto scaling groups based on the configurations specified by the user. For example, if the indicates that an auto scaling group is "flexible" in terms of timing or types of resources, the auto scaling service 106 can present information to the user indicating a timeframe in which the hardware virtualization reasonably expects to be able to provide the requested resources (for example, the service might indicate that it believes it can satisfy the user's scaling request within a day, within a week, or within any other period of time determined based on the requested amount of resources and a forecasted amount of available resources during the relevant time period). As another example, an auto scaling service 106 may present information about a likelihood that a user's auto scaling configurations can be fully satisfied across a span of time in the future based on the user's current configurations.

In some embodiments, at circle "3" in FIG. 1, the auto scaling service generates a fulfillment plan based on the primary and secondary auto scaling configurations specified by the user. A fulfillment plan, for example, generally represents a set of rules or other logic that the auto scaling service 106 can use to determine how to best satisfy the user's specified auto scaling configurations depending on an amount of available capacity and headroom at any given point in time. In an embodiment, the fulfillment plan can thus be used to determine how the auto scaling service 106 respond to requests to scale a user's auto scaling groups received over time, and how to respond to such requests in relation to other requests the auto scaling service 106 may receive from other sources.

In some embodiments, at circle "4" in FIG. 1, the user's virtual computing resources are scaled by the auto scaling service 106 according to the generated fulfillment plan. For example, the auto scaling service 106 can send scaling instructions to a hardware virtualization service 102 or other system component that manages associated auto scaling groups 118A-118N, and other capacity-related components. In FIG. 1, for example, the auto scaling service 106 can send instructions to the hardware virtualization service 102 instructing the service to either increase or decrease a quantity of compute instances (or other type of virtual computing resource in other examples) included in one or more of the auto scaling groups 118A-118N, assuming that the auto scaling service 106 determines that scaling is appropriate.

In some embodiments, the scaling of resources by auto scaling service 106 can include generating one or more forecasts for the auto scaling group based on historical time series data to determine whether the load for the auto scaling group is expected to increase or decrease at one or more points in time in the future (for example, based on one or more machine learning (ML) based models). Based on the forecast, the auto scaling service 106 cause an auto scaling group to increase or decrease a number of compute instances in the group in advance of anticipated load changes. In some embodiments, the auto scaling service 106 can cause an auto scaling group to proactively scale at a time ahead of an anticipated load change that provides sufficient time for the instances to launch and warm-up. For example, there can be data indicating for a particular web application that it takes approximately five minutes on average to launch a new compute instance used to execute an instance of the web application, to warm up associated caches, and to perform other application start up processes before the instance is fully operational. The auto scaling service 106 can obtain this data and determine to launch the instance at least five minutes prior to a future time point when the instance is predicted to be needed, such that the instance is fully operational at the time when demand is predicted to increase.

As indicated, in some embodiments, an auto scaling service 106 can receive requests to throttle the active scaling of one or more auto scaling groups. For example, an application may generate a request to throttle the scaling of one or more auto scaling groups in response to determining that current scaling processes are "browning out" or otherwise degrading one or more downstream services. The downstream services may be accessed, for example, each time a new compute instance is launched into an auto scaling group, where such accesses may cause issues if compute instances are launched at a high rate.

Figure 4:
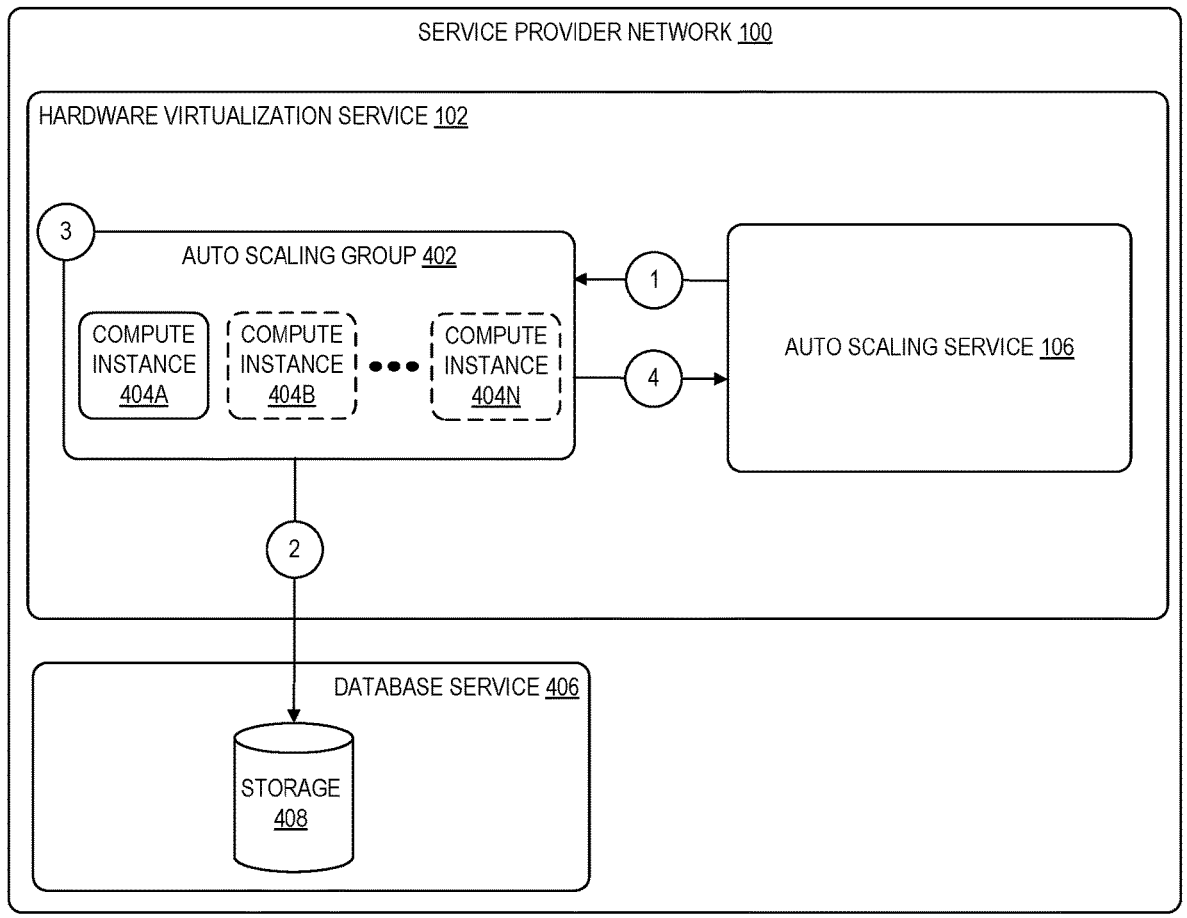
FIG. 4 is a diagram illustrating the use of throttling requests to control the scaling of virtual computing resources according to some embodiments.

FIG. 4 is a diagram illustrating the use of throttling requests to control the scaling of virtual computing resources according to some embodiments. As shown in FIG. 4, a user has created an auto scaling group 402 including a quantity of compute instances 404A-404N. At circle "1," the auto scaling group service 106 causes one or more additional compute instances to launch as part of the auto scaling group 402 (for example, in response to an indication that the load associated with the existing compute instances has exceeded a defined threshold).

At circle "2" in FIG. 4, the one or more newly launched compute instances of the auto scaling group 402 send one or more requests to storage 408 managed by a separate database service 406. The requests, for example, may be part of a startup sequence of the workloads running on the compute instances of the auto scaling group 402. In an embodiment, at circle "3," a component associated with the auto scaling group 402 determines that the storage 408 is unable to handle the volume of requests being sent by the newly launched compute instances and, in circle "4," sends a throttle request to the auto scaling service 106. In response to receiving the throttle request, the auto scaling service 106 reduces the rate at which the service is launching new instances into the auto scaling group 402, or pauses the launching of new instances entirely. Although the example in FIG. 4 shows compute instances accessing a downstream resource at a database service 406, the use of such throttling requests can be used in any instance where it is desired to control the scaling activities of an auto scaling service 106 because downstream resources are being impacted or for any other reasons. In some examples, a throttle request may be used to request that an auto scaling service 106 increase a rate at which new compute instances are being launched, for example, if it is determined that additional capacity is needed as soon as possible.

Figure 5:
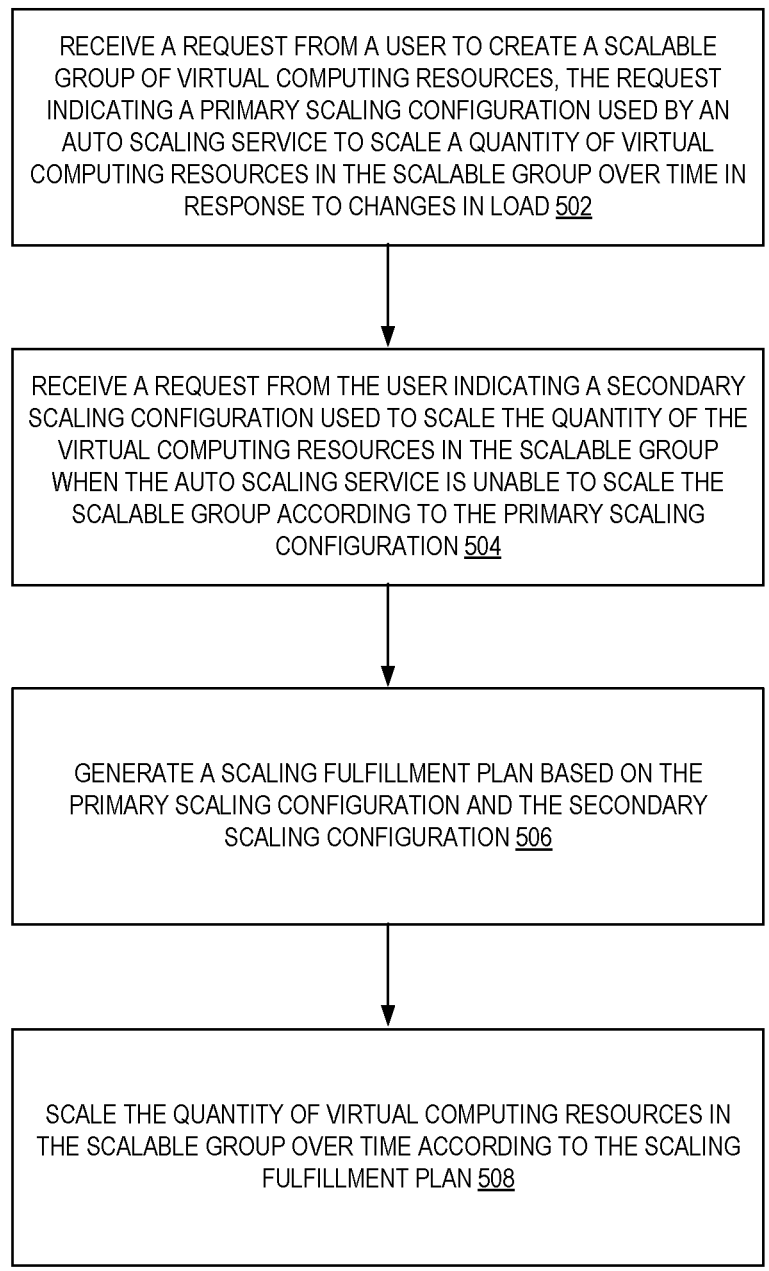
FIG. 5 is a flow diagram illustrating operations of a method for configuring and performing intent-based auto scaling of virtual computing resources according to some embodiments.

FIG. 5 is a flow diagram illustrating operations 500 of a method for configuring and performing intent-based auto scaling of virtual computing resources according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the auto scaling service 106 of the other figures.

The operations 500 include, at block 502, receiving a request from a user to create a scalable group of virtual computing resources, the request indicating a primary scaling configuration used by an auto scaling service to scale a quantity of virtual computing resources in the scalable group over time in response to changes in load.

The operations 500 further include, at block 504, receiving a request from the user indicating a secondary scaling configuration used to scale the quantity of virtual computing resources in the scalable group when the auto scaling service is unable to scale the scalable group according to the at least one primary scaling configuration.

In some embodiments, the request indicating the primary scaling configuration and the request indicating the secondary scaling configuration are the same request. For example, a request from a user to create a scalable group of virtual computing resources can indicate both: a primary scaling configuration used by the auto scaling service to scale a quantity of virtual computing resources in the scalable group over time in responses to changes in load, and a secondary scaling configuration used to scaling the quantity of the virtual computing resources in the scalable group when the auto scaling service is unable to scale the scalable group according to the primary scaling configuration. In other embodiments, the primary scaling configuration and the secondary scaling configuration are each received in separate requests. In some embodiments, the request is received via a graphical user interface (GUI) including a plurality of interface elements used to configure auto scaling of the group of virtual computing resources.

The operations 500 further include, at block 506, generating a scaling fulfillment plan based on the at least one primary scaling configuration and the at least one secondary scaling configuration.

The operations 500 further include, at block 508, scaling the quantity of virtual computing resources in the scalable group over time according to the scaling fulfillment plan.

In some embodiments, the operations further include receiving a request to throttle addition of new virtual computing resources to the scalable group of virtual computing resources; and reducing a rate at which new virtual computing resources are added to the scalable group of virtual computing resources based on the request.

In some embodiments, the secondary scaling configuration specifies an indication that the scalable group of virtual computing resources can be scaled using a set of virtual computing resources having non-homogenous resource configurations, and wherein scaling the quantity of the virtual computing resources includes launching the set of virtual computing resources having the non-homogenous resource configurations.

In some embodiments, the secondary scaling configuration specifies a relative priority among a plurality of scalable groups of virtual computing resources, and wherein scaling the quantity of the virtual computing resources includes prioritizing launching new virtual computing resources for higher-priority scalable groups of virtual computing resources relative to lower-priority scalable groups of virtual computing resources.

In some embodiments, the secondary scaling configuration specifies a span of time in the future at which a user expects to use at least a specified quantity of additional virtual computing resources, and wherein scaling the quantity of the virtual computing resources includes prioritizing launching new virtual computing resources for the scalable group of virtual computing resources during the span of time.

In some embodiments, the secondary scaling configuration includes an indication that the scalable group of virtual computing resources is flexible relative to when additional virtual computing resources are provided to the scalable group of virtual computing resources, and wherein scaling the quantity of the virtual computing resources includes deprioritizing launching new virtual computing resources for the scalable group of virtual computing resources.

In some embodiments, the secondary scaling configuration includes an indication that the quantity of virtual computing resources is to be scaled during periods of low capacity utilization, and wherein the secondary scaling configuration further specifies an execution deadline for a workload associated with the scalable group, and wherein the operations further comprise: identifying a period of low utilization of the virtual computing resources in advance of the execution deadline; and scaling the quantity of virtual computing resources in the scaling group during the period of low utilization.

In some embodiments, the operations further include monitoring a total amount of capacity available to the auto scaling service and a rate at which the auto scaling service can process new scaling requests over time, and wherein scaling the quantity of the virtual computing resource in the scalable group over time according to the scaling fulfillment plan is based in part on the total amount of capacity available to the auto scaling service and the rate at which the auto scaling service can process new scaling requests over time.

In some embodiments, the scalable group of virtual compute resources is a first scalable group of virtual computing resources, the operations further comprising: receiving a first scaling request associated with the first scalable group of virtual computing resources and a second scaling request associated with a second scalable group of virtual computing resources, wherein the auto scaling service is unable to satisfy both the first scaling request and the second scaling request; determining, based on the fulfillment plan, to satisfy only the first scaling request; and scaling the first scalable group of virtual computing resources based on the first scaling request.

In some embodiments, the operations further include generating one or more suggested auto scaling configurations based at least in part on the primary scaling configuration and the secondary scaling configuration; and causing display of the one or more suggested auto scaling configurations in a graphical user interface (GUI) presented to a user.

Figure 6:
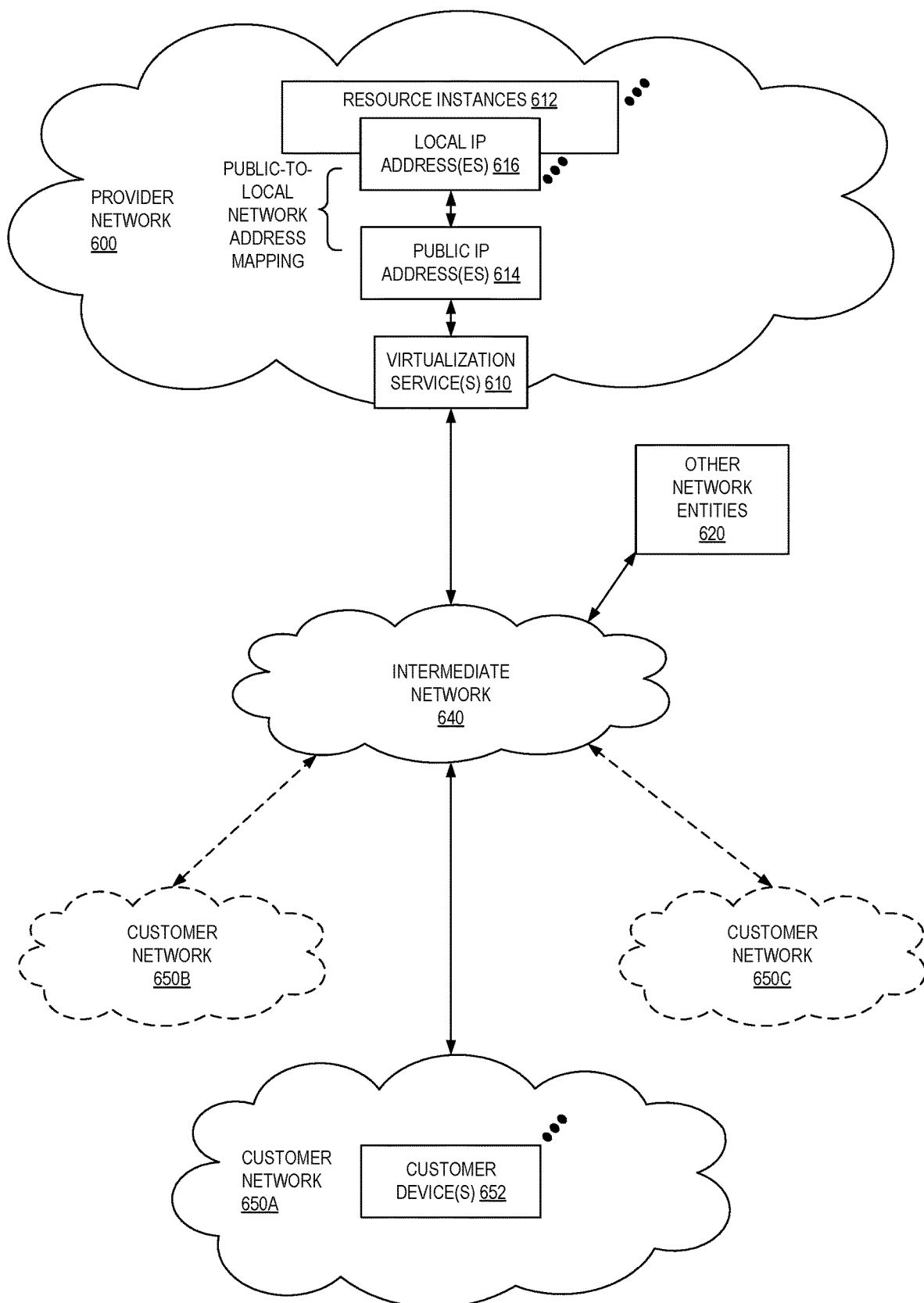
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
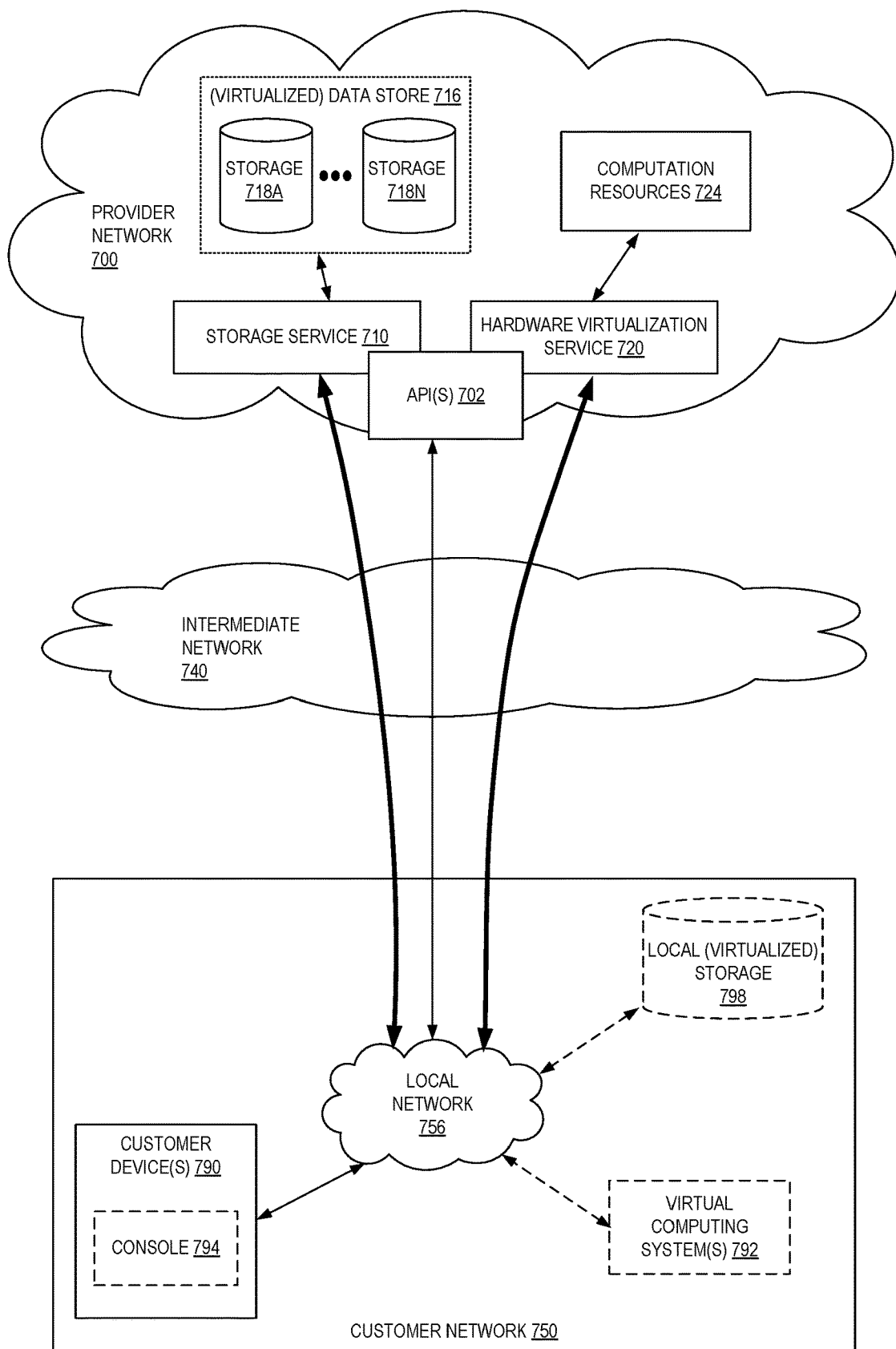
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
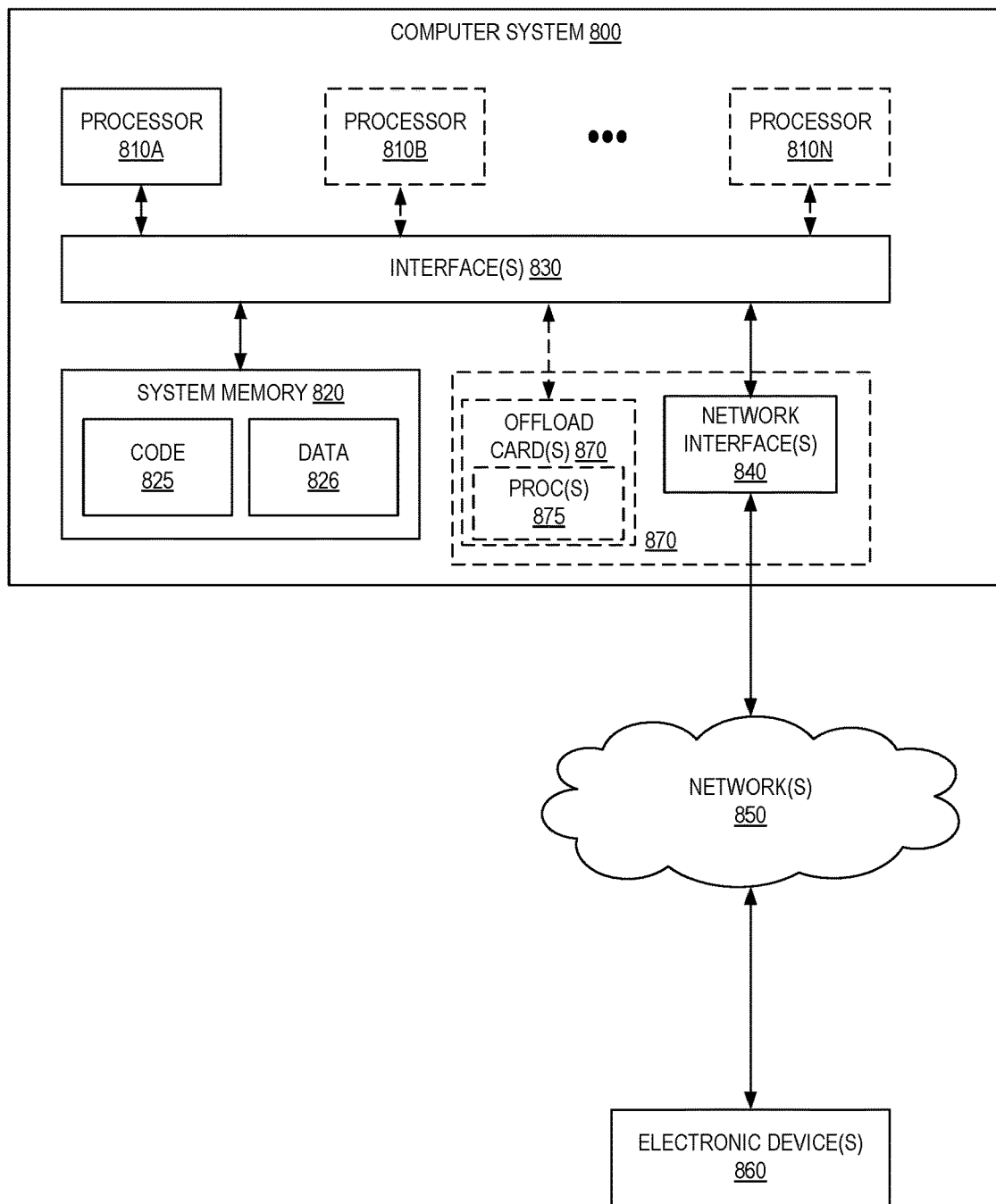
FIG. 8 is a block diagram illustrating an example computer system that may be used in some embodiments.

In some embodiments, a system that implements a portion or all of the techniques for enabling the intent-based auto scaling of computing resources as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request from a user to create a scalable group of compute instances at a service provider network, the request indicating:
      a primary scaling configuration used by an auto scaling service of the service provider network to scale the scalable group of compute instances over time in response to changes in load on the scalable group of compute instances, and
      a secondary scaling configuration used to scale the scalable group of compute instances when the auto scaling service is unable to scale the scalable group of compute instances according to the primary scaling configuration due to capacity limitations or conflicting requests from other sources;
   generating, based on the primary scaling configuration and the secondary scaling configuration, a scaling fulfillment plan used to scale the scalable group of compute instances at one or more points in time in the future according to capacity available to the auto scaling service;
   scaling the scalable group of compute instances over time according to the scaling fulfillment plan; and
   monitoring a total capacity available to the auto scaling service and a rate at which the auto scaling service can process new scaling requests over time, wherein scaling the scalable group of compute instances over time according to the scaling fulfillment plan is based in part on the total capacity available to the auto scaling service and the rate at which the auto scaling service can process new scaling requests over time.

2. The computer-implemented method of claim 1, wherein the secondary scaling configuration specifies at least one of: an indication that the auto scaling group can be scaled using a set of compute instances having non-homogeneous resource configurations, a relative priority among a plurality of scalable groups of compute instances including the scalable group of compute instances, an indication of a span of time in the future at which a user expects to use at least a specified quantity of additional compute instances, an indication the scalable group of compute instances is flexible relative to when additional compute instances are provided to the scalable group of compute instances.

3. The computer-implemented method of claim 1, further comprising:
   receiving a throttle request to throttle addition of new compute instances to the scalable group of compute instances; and
   reducing a rate at which compute instances are added to the scalable group of compute instances based on the throttle request.

4. A computer-implemented method comprising:
   receiving a request from a user to create a scalable group of virtual computing resources, the request indicating:
      a primary scaling configuration used by an auto scaling service to scale a quantity of virtual computing resources in the scalable group over time in response to changes in load, and
      a secondary scaling configuration used to scale the quantity of the virtual computing resources in the scalable group when the auto scaling service is unable to scale the scalable group according to the primary scaling configuration due to capacity limitations or conflicting requests from other sources;
   generating a scaling fulfillment plan based on the primary scaling configuration and the secondary scaling configuration;
   scaling the quantity of the virtual computing resources in the scalable group over time according to the scaling fulfillment plan; and
   monitoring a total capacity available to the auto scaling service and a rate at which the auto scaling service can process new scaling requests over time, wherein scaling the quantity of the virtual computing resources in the scalable group over time according to the scaling fulfillment plan is based in part on the total capacity available to the auto scaling service and the rate at which the auto scaling service can process new scaling requests over time.

5. The computer-implemented method of claim 4, further comprising:
   receiving a throttle request to throttle addition of new virtual computing resources to the scalable group of virtual computing resources; and
   reducing a rate at which new virtual computing resources are added to the scalable group of virtual computing resources based on the throttle request.

6. The computer-implemented method of claim 4, wherein the secondary scaling configuration specifies an indication that the scalable group of virtual computing resources can be scaled using a set of virtual computing resources having non-homogeneous resource configurations, and wherein scaling the quantity of the virtual computing resources includes launching the set of virtual computing resources having the non-homogeneous resource configurations.

7. The computer-implemented method of claim 4, wherein the secondary scaling configuration specifies a relative priority among a plurality of scalable groups of virtual computing resources, and wherein scaling the quantity of the virtual computing resources includes prioritizing launching new virtual computing resources for higher-priority scalable groups of virtual computing resources relative to lower-priority scalable groups of virtual computing resources.

8. The computer-implemented method of claim 4, wherein the secondary scaling configuration specifies a span of time in the future at which a user expects to use at least a specified quantity of additional virtual computing resources, and wherein scaling the quantity of the virtual computing resources includes prioritizing launching new virtual computing resources for the scalable group of virtual computing resources during the span of time.

9. The computer-implemented method of claim 4, wherein the secondary scaling configuration includes an indication that the scalable group of virtual computing resources is flexible relative to when additional virtual computing resources are provided to the scalable group of virtual computing resources, and wherein scaling the quantity of the virtual computing resources includes deprioritizing launching new virtual computing resources for the scalable group of virtual computing resources.

10. The computer-implemented method of claim 4, wherein the secondary scaling configuration includes an indication that the quantity of virtual computing resources is to be scaled during periods of low capacity utilization, and wherein the secondary scaling configuration further specifies an execution deadline for a workload associated with the scalable group, and wherein the method further comprises:
    identifying a period of low utilization of the virtual computing resources in advance of the execution deadline; and
    scaling the quantity of virtual computing resources in the scaling group during the period of low utilization.

11. The computer-implemented method of claim 4, wherein the scalable group of virtual computing resources is a first scalable group of virtual computing resources, the method further comprising:
    receiving a first scaling request associated with the first scalable group of virtual computing resources and a second scaling request associated with a second scalable group of virtual computing resources, wherein the auto scaling service is unable to satisfy both the first scaling request and the second scaling request;
    determining, based on the fulfillment plan, to satisfy only the first scaling request; and
    scaling the first scalable group of virtual computing resources based on the first scaling request.

12. The computer-implemented method of claim 4, wherein the request is received via a graphical user interface (GUI) including a plurality of interface elements used to configure auto scaling of the group of virtual computing resources.

13. The computer-implemented method of claim 4, further comprising:

generating one or more suggested auto scaling configurations based at least in part on the primary scaling configuration and the secondary scaling configuration; and
causing display of the one or more suggested auto scaling configurations in a graphical user interface (GUI) presented to a user.

14. A system comprising:
an auto scaling service implemented by a first set of electronic devices, the auto scaling service including first instructions that, when executed by a first processor, cause the auto scaling service to:
    receive a request from a user to create a first scalable group of virtual compute instances at a service provider network, the request indicating:
        a primary scaling configuration used by an auto scaling service of the service provider network to scale the first scalable group of virtual compute instances over time in response to changes in load, and
        a secondary scaling configuration used to scale the first scalable group of virtual compute instances when the auto scaling service is unable to scale the first scalable group of virtual compute instances according to the primary scaling configuration due to capacity limitations or conflicting requests from other sources;
    generate, based on the primary scaling configuration and the secondary scaling configuration, a scaling fulfillment plan used to scale the first scalable group of virtual compute instances over time; and
    send scaling instructions to a hardware virtualization service according to the scaling fulfillment plan; and
the hardware virtualization service implemented by a second one or more electronic devices, the hardware virtualization service including second instructions that, when executed by a second processor, cause the hardware virtualization service to:
    receive the scaling instructions from the auto scaling service, and
    scale the first scalable group of virtual compute instances over time according to the scaling instructions;
the auto scaling service including further instructions that upon execution cause the auto scaling service to:
    receive a first scaling request associated with the first scalable group of virtual compute instances and a second scaling request associated with a second scalable group of virtual compute instances, wherein the hardware virtualization service is unable to satisfy both the first scaling request and the second scaling request;
    determine, based on the fulfillment plan, to satisfy only the first scaling request; and
    send further scaling instructions to the hardware virtualization service to scale the first scalable group of virtual compute instances based on the first scaling request.

15. The system of claim 14, the auto scaling service including further instructions that upon execution further cause the auto scaling service to:
    receive a throttle request to throttle addition of new virtual computing resources to the first scalable group of virtual compute instances; and
    reduce a rate at which new virtual computing resources are added to the first scalable group of virtual compute instances based on the throttle request.

16. The system of claim 14, wherein the secondary scaling configuration specifies an indication that the first scalable group of virtual compute instances can be scaled using a set of compute instances having non-homogeneous resource configurations, and wherein scaling the first scalable group of virtual compute instances includes launching the set of compute instances having the non-homogeneous resource configurations.

17. The system of claim 14, wherein the secondary scaling configuration specifies a relative priority among a plurality of scalable groups of compute instances, and wherein scaling the first scalable group of virtual compute instances includes prioritizing launching new virtual compute instances for higher-priority scalable groups of compute instances relative to lower-priority scalable groups of compute instances.

18. The system of claim 14, wherein the secondary scaling configuration specifies a span of time in the future at which the user expects to use at least a specified quantity of additional compute instances, and wherein scaling the first scalable group of virtual compute instances includes prioritizing launching new compute instances for the first scalable group of virtual compute instances during the span of time.

19. The system of claim 14, wherein the secondary scaling configuration includes an indication that the first scalable group of virtual compute instances is flexible relative to when additional compute instances are provided to the first scalable group of virtual compute instances, and wherein scaling the first scalable group of virtual compute instances includes deprioritizing launching new compute instances for the first scalable group of virtual compute instances.

20. The system of claim 14, wherein the secondary scaling configuration includes an indication that the first scalable group of virtual compute instances is to be scaled during periods of low capacity utilization, and wherein the secondary scaling configuration further specifies an execution deadline for a workload associated with the first scalable group of virtual compute instances, and wherein the auto scaling service includes further instructions that upon execution further cause the auto scaling service to:
    identify a period of low utilization of the first scalable group of virtual compute instances in advance of the execution deadline; and
    scale the first scalable group of virtual compute instances during the period of low utilization.

\* \* \* \* \*